UNITED STATES PATENT OFFICE.

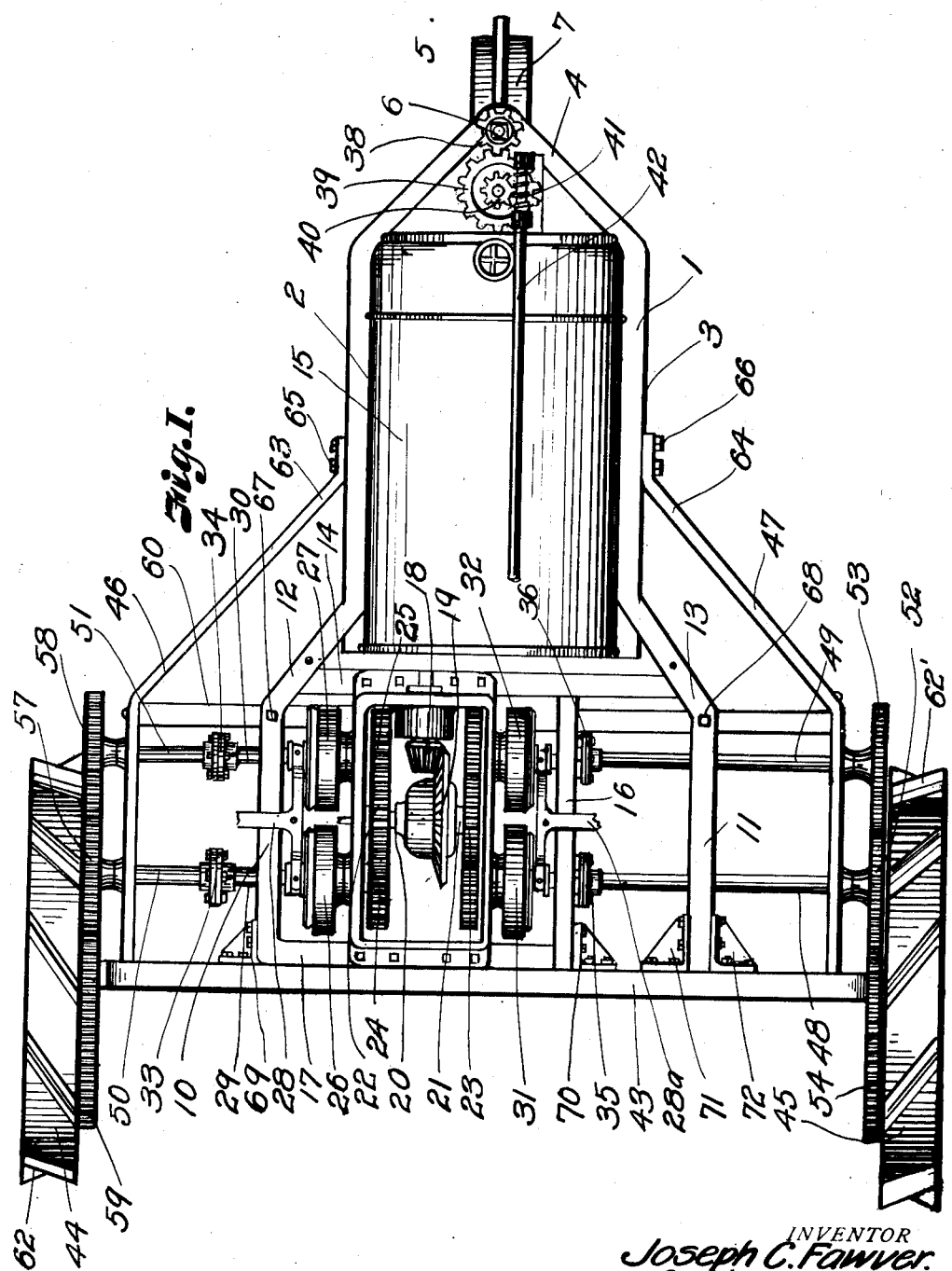

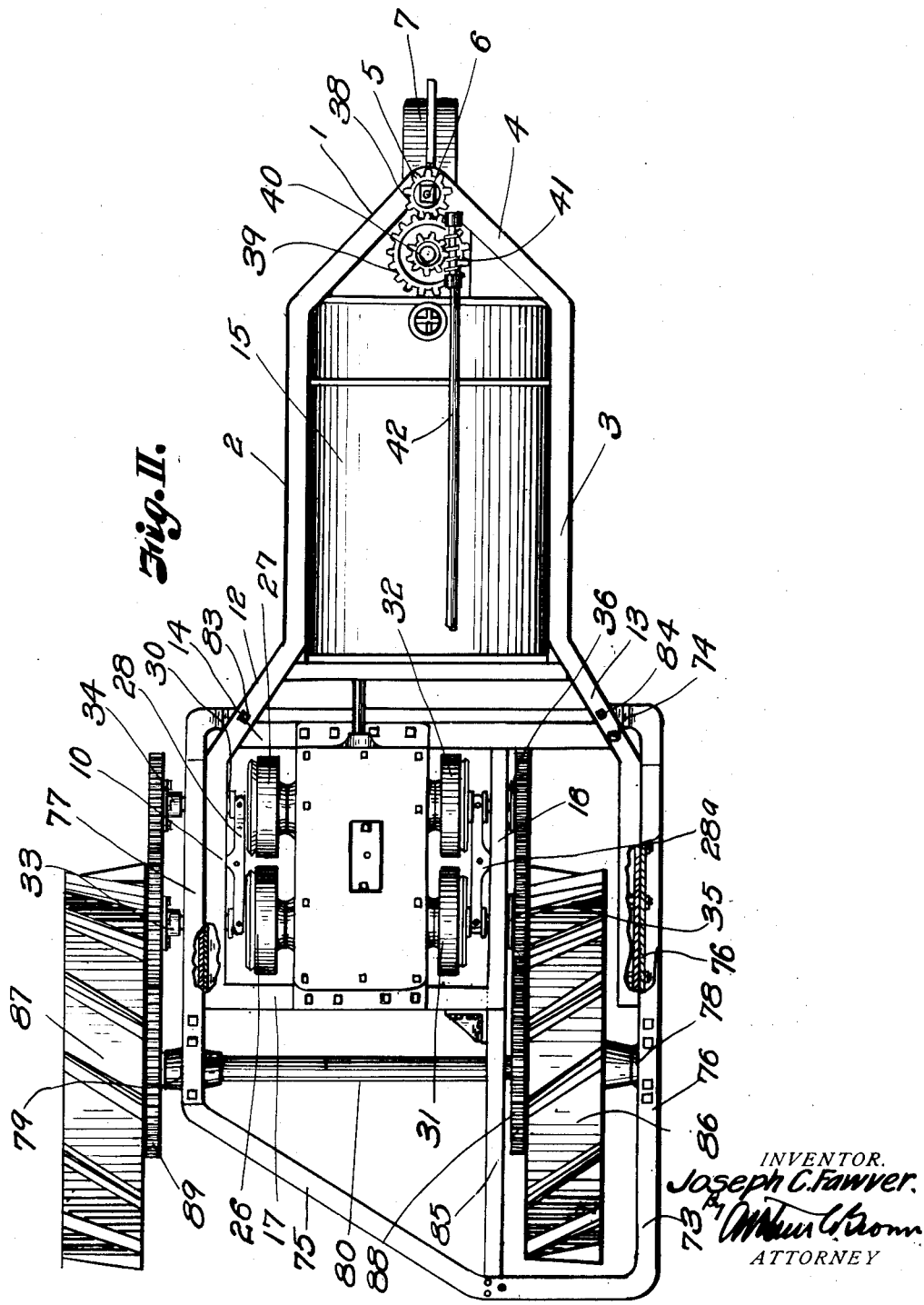

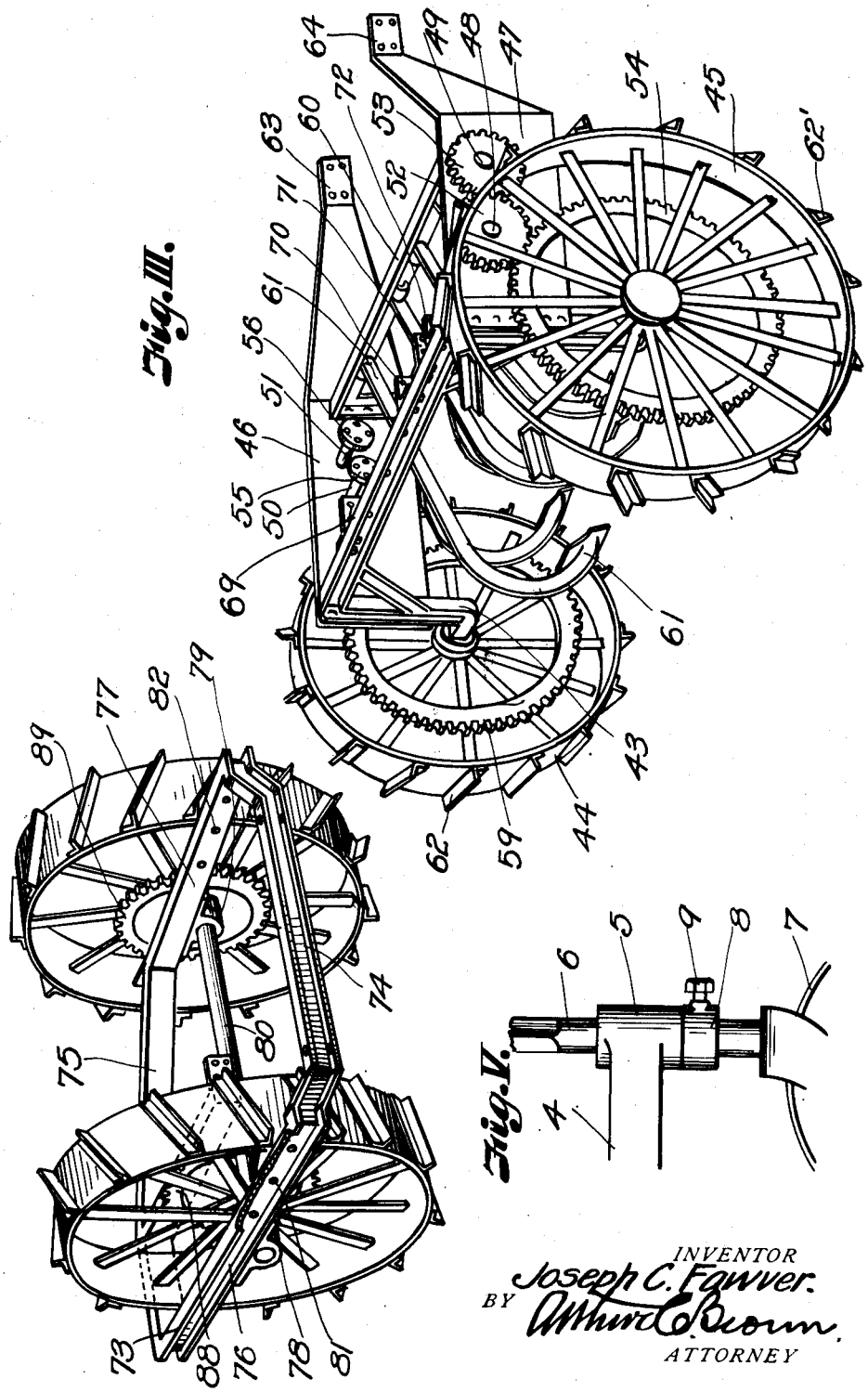

JOSEPH C. FAWVER, OF KANSAS CITY, MISSOURI.

TRACTOR.

1,355,826. Specification of Letters Patent. Patented Oct. 19, 1920.

Application filed July 28, 1919. Serial No. 313,787.

*To all whom it may concern:*

Be it known that I, JOSEPH C. FAWVER, a citizen of the United States, residing at Kansas City, in the county of Jackson and State of Missouri, have invented certain new and useful Improvements in Tractors; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to tractors adapted for general use and one of the objects of the invention is to provide a tractor which is convertible for use in various capacities. For example, the draft rigging of cultivators must be elevated a considerable distance from the ground to accommodate the device to the height of the growing plants whereas plows, either single or in gang, or other earth working tools for preparing the soil, function best if the draft line is relatively close to the ground.

I have provided means whereby a cultivator frame and a plow frame, or other suitable ground working implements, may be interchangeably connected to the power element-supporting frame of the tractor, thereby enabling me to convert the device into a number of different machines without the necessity of employing a separate power generating mechanism for each separate service, and I accomplish this in a convenient and expeditious manner.

In the drawings,

Figure I is a plan view of a device constructed in accordance with my invention, the cultivator frame being attached to the power generating mechanism support.

Fig. II is a similar view showing the plow frame interchanged for the cultivator mechanism.

Fig. III is a detail perspective view of the cultivator draft mechanism.

Fig. IV is a detail perspective view of the plow draft mechanism, and

Fig. V is a detail elevational view of part of the caster wheel support.

Referring now to the drawings by numerals of reference:

1 designates the vehicle-power-device-supporting frame which consists of the side bars 2 and 3 connected at their forward ends by a substantially V-shaped integral member 4 provided at the angle with a bar 5 to receive the pintle 6 of a caster wheel 7, the pintle being adjustable in the bearing 5 through the medium of the collar 8 and nut 9. The rear portion of the frame is provided with rearwardly extending members 10 and 11 which are spaced greater distances apart than are the bars 2 and 3, and these extensions 10 and 11 are connected to the side bars 2 and 3 by the diverging portions 12 and 13, the members 12 and 13 being connected by a transverse bar 14, and the forward portion of the frame supporting an engine in a case 15, the construction of the engine being immaterial.

Complementary to the side bar 10 is an intermediate longitudinal bar 16 which is connected to an end member 17, preferably a part of 10 and to the member 14, so that a rectangular frame is provided which supports the differential gearing and certain transmission mechanism. The gearing is best shown in Figs. I and II. A pinion 18 is on the drive shaft of the engine from the ordinary transmission and is adapted to mesh with the master gear 19 of the differential. The construction of the differential is immaterial but I prefer to employ a "locking" differential such, for example, as shown in Patent 1,164,770 to M. Walter, dated December 21, 1915. The shaft members 20 and 21 of the differential are provided with gears 22 and 23. The gear 22 meshes with the gears 24 and 25 on shafts carried by the rectangular frame and these shafts are provided with clutches 26 and 27, preferably of the friction type, simultaneously operated by a lever 28 whereby when one clutch is in clutching position, the other clutch is loose. Therefore, whichever shaft of the gears 24 and 25 is in driving connection with gear 23 will determine the active shaft 29 or 30, as the case may be.

Similar clutch mechanisms designated generically 31 and 32 are driven from gear 23 and these may be operated by a lever 28$^A$, as just described for the clutches on the opposite side. There are couplings for the four shafts provided with clutches and these couplings are designated 33, 34, 35 and 36, the couplings being adapted to drive the gearing for the cultivator shaft, as shown in Fig. I, or the gearing for the plow draft rigging, as shown in Fig. II.

It will be observed that the clutch levers 28 and 28^A may be independently operated so that in turning a short corner, the forward clutch on one side may be thrown in and the rearward clutch on the other side, so that a square turn may be effected.

It will also be observed that on the pintle 6 is a gear 38, meshing with a gear 39 mounted on the frame 1 and carrying a smaller gear 40 engaged by the worm 41 on the steering shaft 42 leading to the rear of the machine whereby the caster wheel may be turned from right to left or vice versa to steer the machine. If it is desired to cultivate grain, the device shown specifically in Fig. III will be attached to the power mechanism.

The cultivator draft frame is shown as consisting of a yoke 43 supported upon tractor wheels 44 and 45 and leading forwardly from the sides of the yoke are side bars 46 and 47, which serve as bearings for gear shafts 48, 49, 50 and 51 extending into the frame formed by the yoke and the side bars, and each shaft carries a gear at one end and a coupling member at the other.

By reference to Fig. III it will be observed that the gears 52 and 53 on shafts 48 and 49 mesh one with the other and with a gear 54 on the wheel 45. The opposite ends of the shafts 48 and 49 are provided with clutch members similar to the clutch members 55 and 56 on the shafts 50 and 51, which project through the side 46 and which carry gears 57 and 58 corresponding to the gears 52 and 53, and these gears are adapted to mesh with a circular rack or gear 59 on wheel 44. Therefore, it will be seen that according to the clutch or clutches thrown in operation, the direction and turning movement of the mechanism will be governed.

It is to be understood that each driven gear in the respective trains carried by the rectangular frame has a clutch member rigid therewith while the complementary clutch members are slidable on alining shafts, which extend into and are loosely mounted in the gears which constitute bearings for said shafts.

The side bars 46 and 47 are connected by a draft bar or frame 60 to which the cultivator tools 61 may be secured and it will be observed that the wheels 44 and 45 are provided with shoes 62 and 62' respectively to form sufficient traction in the ground to move the machine forwardly under the power generated by the engine.

By reference to Fig. I it will be observed that the forward portions 63 and 64 of the cultivator frame may be fastened to the sides 2 and 3 by suitable fastening devices 65 and 66 and that the extensions 10 and 11 may be secured to the draft frame 60 by fastening devices 67 and 68 and to the yoke by the brackets 69, 70, 71 and 72, which are removably attached thereto so that the cultivator frame may be removed if desired.

When the cultivator is being used, the bearing 5 will be next the top of the pintle 6 but when it is desired to utilize the device for propelling plows, the mechanism shown in Fig. III is removed and the mechanism shown in Fig. IV is substituted. In this case, however, the bearing 5 will be next the base of the pintle 6 to lower the frame carrying the engine and transmission.

When the cultivator frame is to be removed, the couplings 33, 34, 35 and 36 are taken apart and instead of shafts 48, 49, 50 and 51, gears corresponding to the gears 52 and 57 and 58 are secured to the coupling members direct, as shown in Fig. II. These gears are adapted to mesh with gears on the axle frames of the plow draft mechanism, as will be explained hereinafter. The construction of the plow draft mechanism is best shown in Fig. IV as comprising a substantially rectangular frame 73 consisting preferably of a channel and having a depending off-set portion 74 at the front end, the rear end having a slightly inclined portion as indicated at 75. The webs of the side bars 76 and 77 which carry the bearings 78 and 79 for the axle 80 have perforations 81 and 82 to register with corresponding perforations in the rear extensions 10 and 11 so that fastening devices may be used to secure the frame 73 to the extension. The offset portion 74 resting beneath the diverging members 12 and 13 is fastened thereto by fastening devices 83 and 84 and the bar 16 is fastened to a corresponding alining bar 85 on frame 73 to provide rigidity of the structure. The traction wheel 86 on shaft 80 is inclosed between the side bar 76 and the bars 16 and 85 while the traction wheel 87 is on the outside of the frames, and the respective traction wheels carry circular gears 88 and 89 adapted to mesh with gears driven through the differential, as heretofore explained.

The clutch mechanisms for operating the traction wheels loose on shaft 80 are the same as described in connection with the cultivator so no extended description of the same will again be necessary.

It will be apparent, however, that the cultivator frame and plow frame are conveniently interchangeable and that both may be driven by mechanism carried by an engine-supporting frame without materially re-arranging the power mechanism.

For the purpose of illustrating the convertibility of the device, I have shown the cultivator frame and the plow frame although it is obvious that the interchangeable frame may not necessarily be limited to any particular use. For example, the frames might be changed to adapt them for trucks without departing from the spirit of my invention, the primary object being to provide a device which is convertible for use in various ways at relatively small expense.

What I claim and desire to secure by Letters-Patent is:

1. In a tractor, a power source-carrying frame having a rearward extension, transverse shafts carried by the extension gears carried by the shafts, additional shafts in line with the first mentioned shafts, clutches interposed between the first and second mentioned shafts, a supplemental wheel-carrying frame, and means for driving the wheels on the wheel-carrying frame from the second mentioned shaft.

2. In a tractor, a main power carrying frame having a rearward extension, a differential gearing carried by the extension, means for driving said differential gearing from the power source of the main frame, pairs of shafts on the respective sides of the rearward extension and in driving connection with the differential gearing, clutches on said shafts, a supplemental frame, pairs of shafts mounted in the respective sides of the supplemental frame and alining with the pairs of shafts on the main frame extension, means for connecting complementary shafts on the supplemental frame and main frame extension, and means for removably connecting the supplemental frame to the main frame.

3. In a tractor, a main power carrying frame having a rearward extension, pairs of transversely extending shafts mounted on the main frame extension, means carried by the main frame for driving in synchronism each shaft embodying a clutch, pairs of clutches for the respective pairs of shafts, means for moving a clutch in one pair into clutching position and simultaneously moving a clutch of the same pair out of operative position, a supplemental frame having shafts alining with the shafts on the main frame, means for connecting said shafts to shaft elements on the main frame, wheels supporting said supplemental frame, and gear connections between the shafts on the supplemental frame and the wheels.

4. In a tractor, a main power carrying frame, a rearward extension on said frame, a differential gearing carried by said extension, means on the main power carrying frame for imparting movement to said differential gearing, pairs of gears in constant driving engagement with the differential gearing, clutches connected to said pairs of gears, means for alternately functioning said clutches of the respective pairs, shaft elements coöperating with the respective clutches, traction wheels, and gearing between the last named shaft elements and the traction wheels.

In testimony whereof I affix my signature.

JOSEPH C. FAWVER.